G. J. HELY.
AUTOMATIC POWER CUT-OFF.
APPLICATION FILED OCT. 14, 1913.

1,186,188.

Patented June 6, 1916.

Witnesses:
Frank H. Fowler
E. Grant

Inventor
George J. Hely
By Fred P. Gorin
Attorney

UNITED STATES PATENT OFFICE.

GEORGE J. HELY, OF SEATTLE, WASHINGTON.

AUTOMATIC POWER CUT-OFF.

1,186,188.　　　　Specification of Letters Patent.　　Patented June 6, 1916.

Application filed October 14, 1913. Serial No. 795,137.

*To all whom it may concern:*

Be it known that I, GEORGE J. HELY, a citizen of Persia, and a resident of Seattle, in the county of King and State of Washington, have invented certain new and useful Improvements in Automatic Power Cut-Offs, of which the following is a specification.

This invention relates to conveyers, and has for its principal object to provide a very simple, durable form of conveyer and its actuating means, wherein the power is automatically cut off whenever the conveyer becomes loaded to a degree which is sufficiently below the breaking point of the conveyer chain, or other such member, to insure that no damage will result to the conveyer chain due to overloading thereof.

Other objects and features will appear as the invention is more fully described in the following specification, illustrated in the accompanying drawings, and pointed out in the appended claims.

Figure 1:
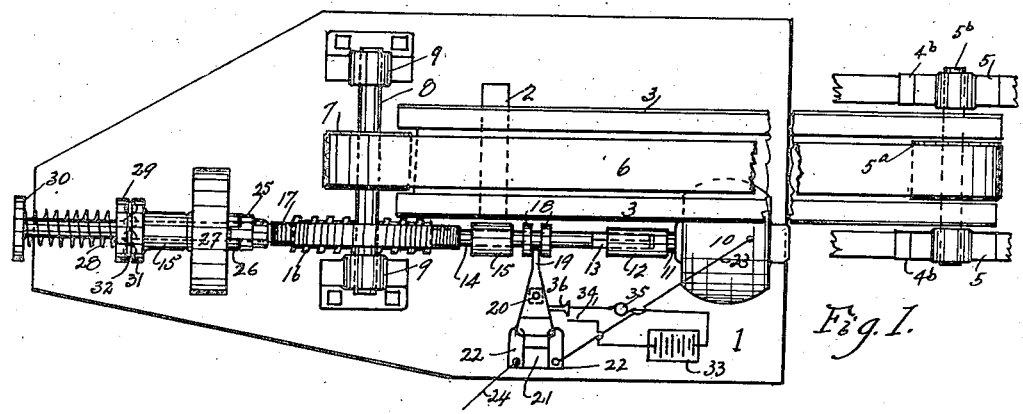
Figure 2:
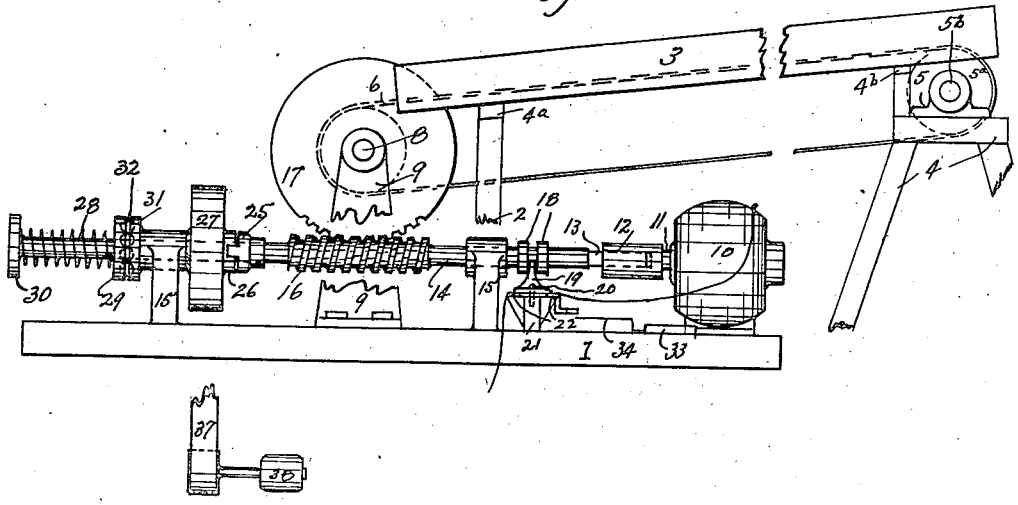

In the drawings, Figure 1, is a plan view of my device, partly broken away. Fig. 2, is a similar view in side elevation.

Referring now more particularly to the drawings, reference numeral 1 designates the bed of the device, upwardly extending from which are the risers 2, which are joined by the cross timber 4ª, upon which is supported one end of the chute 3, as plainly shown in the drawings, which is supported at suitable intervals by the brackets 4ᵇ, upon the horses 4, upon one of which are the bearings 5, in which is mounted the shaft 5ᵇ of the pulley 5ª, over which runs the endless conveyer, which, in this instance, is in the form of the belt 6, which also passes around the pulley 7, whose shaft 8 is revolubly mounted in the bearings 9, fixed to the bed 1. Fixed to the bed 1 is the motor 10, the shaft 11 of which terminates in the sleeve 12, the opening in which sleeve is angular as viewed from its end, and into which loosely fits the shank 13, which is angular in cross section. The shaft 14, which is integral with the shank 13, is revolubly mounted in the bearings 15 fixed to the bed 1, and upon the said shaft is the worm 16 which meshes with the worm wheel 17 fixed to the shaft 8. Upon the shaft 14 are fixed the collars 18, between which is one end of a switch 19, pivoted at 20, to the bracket 21, fixed to the bed 1. The opposite end of the said switch is adapted to contact with the two plates 22, fixed to the said bracket, to complete the electrical circuit of the positive and negative wires 23 and 24 of the motor 10. Upon one end of the shaft 14 is the male member 25 of the clutch which coöperates with the female member 26, fixed to the friction pulley 27, which is loose upon the shaft 14. Upon the left hand end of the said shaft is the helical spring 28, confined between the two washers 29 and 30, the former of which is fixed to the shaft 14 and the latter is loose thereon. Formed upon one of the bearings 15 is the washer 31, in which, as well as the washer 29, may be a ball race for the anti-friction balls 32.

33 indicates a battery within whose electrical circuit, indicated by the wire 34, is the bell 35, and the said circuit is adapted to be opened and closed by means of the switch 36, which extends from the switch 19.

When the switch 19 is in its position, as shown in the drawings, and the motor 10 is running the shaft 14, through the sleeve 12, is rotated, and, through the worm 16 and its wheel 17, the conveyer belt 6 is set in motion. It is clear that if the said belt be loaded to such degree that the power transmitted from the said motor is no longer sufficient to turn the wheel 17, the latter comes to rest, but the shaft 14 will continue to revolve, which, through the coöperation of the worm 16 and the now stationary wheel 17, causes the said shaft to advance itself longitudinally in its bearings, which moves the end of the switch 19 which is between the collars 18, about the pivot 20 until the opposite end of the said switch no longer connects the plates 22, which, of course, interrupts the electrical circuit from the motor 10 and causes it to stop. During the movement of the switch 19, just described, it is clear that the switch 36 has been so moved as to complete the circuit from the battery 33 and has caused the bell 35 to ring.

If the conveyer be run by other means than the motor 10, a suitable belt such as indicated at 37, may connect the engine 38 with the wheel 27 and the power be thus transmitted to the shaft 14 and its connections. Whether power be applied by means of the motor 10 or from a different source, through the wheel 27, the effect of overloading the conveyer belt is obviously the same as that already described in so far as the longitudinal movement of the shaft 14 is concerned. If the power be applied through the wheel 27, the longitudinal movement of the shaft 14 withdraws the male portion 25 from the female portion 26 of the clutch mechanism, thus shutting off the power and causing the bell 36 to ring. While the bell, or some other such alarm is a desirable element, it is not absolutely necessary, of course, because the stoppage of the conveyer belt would be in itself usually quickly apparent to the laborers or other attendants in the vicinity of the conveyer.

While I have shown a particular form of embodiment of my invention, I am aware that many changes therein may readily suggest themselves to others skilled in the art, without departing from the spirit and scope of the invention, and I do not therefore desire to be limited to the exact form hereinabove described and shown in the accompanying drawings.

What I claim as new and desire to protect by Letters Patent is:

1. The combination with a driven element and its source of power, of transmission means which include a worm wheel, a shaft having a worm integral therewith, a pulley which normally rotates with the shaft, whereby when the said worm wheel becomes stationary the said shaft has a sliding movement with respect to the said worm wheel and the said pulley is released from operative engagement with the said shaft.

2. The combination with a driven element and its source of power, of a worm wheel for driving the said element, a shaft having a worm integral therewith, which is adapted to move longitudinally when the said wheel becomes stationary and the said shaft continues to rotate, a clutch which becomes inoperative automatically, due to the movement of the said shaft, whereby the power is automatically shut off when the said driven element is loaded sufficiently to stop the said worm wheel.

3. The combination with a driven element and its source of power, of power transmission means between the said element and its said source of power which includes a shaft having a worm integral therewith and a pulley normally rotatable with said shaft and which has an automatic movement independent of the said element, and means which is brought into action by the stopping of the said element and the continued rotation of the said shaft to rotatably disconnect the said pulley from the said shaft.

4. In a device of the class described, the combination with a driven element and a source of power, of a worm wheel for driving the said element, a worm secured to its worm shaft, the said worm coöperating with the worm wheel and the said worm and its shaft being slidable longitudinally under the thrusting influence of the worm wheel, a pulley slidably mounted on said worm shaft, and a clutch secured to the worm shaft and normally coöperating with the said pulley and securing it rotatively with said shaft.

GEORGE J. HELY.

Witnesses:
MAY L. GORDON,
R. D. SMALLEY.